US008351072B2

(12) United States Patent
Mitani

(10) Patent No.: US 8,351,072 B2
(45) Date of Patent: Jan. 8, 2013

(54) IMAGE PROCESSING APPARATUS FOR GENERATING MARK-SENSE SHEET AND METHOD OF THE IMAGE PROCESSING APPARATUS

(75) Inventor: Yasutaka Mitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1173 days.

(21) Appl. No.: 11/689,916

(22) Filed: Mar. 22, 2007

(65) Prior Publication Data

US 2007/0236709 A1 Oct. 11, 2007

(30) Foreign Application Priority Data

Apr. 5, 2006 (JP) ................................ 2006-103722

(51) Int. Cl.
*H04N 1/00* (2006.01)
*H04N 1/40* (2006.01)
*G06K 15/00* (2006.01)

(52) U.S. Cl. ........................ 358/1.6; 358/1.18; 358/3.24

(58) Field of Classification Search .................. 358/1.6, 358/1.18, 3.24; 715/202
See application file for complete search history.

(56) References Cited

U.S. PATENT DOCUMENTS

| | | | | |
|---|---|---|---|---|
| 6,141,111 | A * | 10/2000 | Kato | 358/1.15 |
| 6,623,528 | B1 * | 9/2003 | Squilla et al. | 715/202 |
| 7,525,675 | B2 * | 4/2009 | Shelton et al. | 358/1.13 |
| 2005/0050331 | A1 * | 3/2005 | Skurdal et al. | 713/176 |

FOREIGN PATENT DOCUMENTS

| | | | |
|---|---|---|---|
| JP | 2004-025576 | A | 1/2004 |
| JP | 2004-034584 | A | 2/2004 |
| JP | 2005-227576 | A | 8/2005 |

* cited by examiner

*Primary Examiner* — Marivelisse Santiago Cordero
*Assistant Examiner* — Mesfin Getaneh
(74) *Attorney, Agent, or Firm* — Canon USA, Inc., I.P. Division

(57) ABSTRACT

An image scanning unit scans a mark-sense sheet to read editing information for specifying edit modes for editing image data to be output as one page of print data. On the basis of the read editing information, print data is generated from the image data. The editing information is read from grouping marks for grouping photo images, rotation marks, and the like. Photo images divided into groups by marking the grouping marks are output on one page of print data in orientations specified by marking the rotation marks.

15 Claims, 13 Drawing Sheets

IMAGE PROCESSING APPARATUS FOR GENERATING MARK-SENSE SHEET AND METHOD OF THE IMAGE PROCESSING APPARATUS

BACKGROUND OF THE INVENTION

1. Field of the Invention

The present invention relates to an image processing apparatus including an image scanning unit and configured to generate print data according to a scanning result obtained by scanning a mark-sense sheet with the image scanning unit, and also relates to a method of the image processing apparatus.

2. Description of the Related Art

Printers currently available on the market include those provided with memory card slots and capable of printing photo images stored in a memory card without being connected to a personal computer (PC). Also commercially available are printers having an external device connecting terminal for connection to a digital camera and capable of printing photo image data stored in memory of the digital camera. Such functions of the printers are referred to as "photo-direct printing (or direct printing)" function in that printing is performed without using a host device, such as a PC.

Examples of the above-described printers include a printer in which a print head of a printing unit can be replaced with an optical scanning head, and a so-called multifunction printer (MFP) which combines a scanner.

There is a known printer including an image scanning unit as described above and capable of printing a mark-sense navigation sheet such as that illustrated in FIG. 7. When a user fills in marks on the mark-sense navigation sheet, the printer scans the marked sheet and thus controls image printing according to settings specified by the filled-in marks on the sheet. This technique is disclosed, for example, in Japanese Patent Laid-Open No. 2004-34584.

On a mark-sense photo navigation sheet 701 of FIG. 7, photo images stored in a memory card are printed in a reduced size as thumbnail images 704. Mark boxes 702 and 703 for selecting the size and type of print sheets are also printed. Additionally, a mark field 705 for specifying the number of copies of the corresponding image to be printed is provided under each of the thumbnail images 704. By filling in marks in the mark boxes 702 and 703 and mark fields 705 using a pencil or the like as illustrated in FIG. 8, the user can select the size and type of print sheets, desired images, and can specify the number of copies of the images to be printed.

As mentioned above, a mark-sense navigation sheet is implemented by an MFP which combines a printing unit, scanning unit, operating unit, display unit, memory card slots, and the like. Such an MFP is capable of copying and printing images, storing photo-scanned images in a memory card, and photocopying photo image data in the memory card without being connected to a PC. Other examples of MFPs of this type include those provided with a connection interface to an external device (such as a PC) or a facsimile function (i.e., image communication function).

Some models of these MFPs do not provide a display unit for displaying images or provide only limited display capabilities. Since such MFPs cannot display sufficient information to the user as to what photo image data is stored in a storage device such as a memory card, the use of the above-described mark-sense navigation sheet is particularly effective when printing is to be performed without using a PC.

Since higher-capacity and less-expansive memory cards are becoming widespread and removable and portable hard disk drives (HDDs) with external connection capabilities are commercially available these days, it is suggested that an MFP is configured to include or allow large-capacity storage units to be connected thereto. Examples of the large-capacity storage units include compact disk/digital versatile disk read only memory (CD/DVD-ROM) drives and a magneto-optical disk (MO), as well as a HDD.

Such a large-capacity storage unit can store a very large number of pieces of image data as many as several hundreds to several tens of thousands. This enables users to easily store image data at low costs and create, as an alternative to a traditional paper-based album, a so-called electronic album in which photo images can be stored. If many pieces of photo image data are stored in a storage unit, there will be a growing need for capabilities that allow printing of photo images in a traditional album format.

A known mark-sense navigation sheet such as that described above is designed to allow images (primarily photo images) to be printed one by one. In an MFP or combined system to which a storage unit is connected as described above, the number of stored images is very large.

However, since the known mark-sense navigation sheet does not fully support layout printing and organization of a plurality of images, layout printing and organization of a plurality of images cannot be performed.

In particular, since an MFP or combined system capable of accommodating large-capacity storage units is used for a variety of purposes ranging from private to business purposes, it is expected that many and various types of images are to be organized or stored therein. Therefore, if there is a mark-sense navigation sheet that can control printing functions, such as allocation, organization, and layout of a plurality of pieces of image data, great value can be added to printing functions for printing in an album format.

Album printing involves grouping of images stored in a storage unit. For example, photo images are classified according to the user's preferences, such as photographing events (e.g., athletic meetings, picnics) and subjects (e.g., elder brother, younger brother).

Album printing also involves adjustment of the orientation of images. If the horizontal to vertical ratio of each image photographed by a camera is not 1:1, it is necessary to rotate images as desired since the user takes pictures either in portrait or landscape mode. It is preferable if, in addition to being rotated, images can be flipped either vertically or horizontally as desired by the user.

However, as described above, the known mark-sense navigation sheet (such as the photo navigation sheet 701 illustrated in FIG. 7 (or FIG. 8)) is designed to allow images to be printed one by one and does not support grouping and orientation adjustment of images.

SUMMARY OF THE INVENTION

Accordingly, embodiments of the present invention provide a technique for controlling, using a mark-sense sheet, print data editing functions such as grouping and orientation adjustment, as well as allocation, organization, and layout necessary for generating one page of print data to be printed in an album format.

According to an aspect of the present invention, an embodiment is directed to an image processing apparatus including an image scanning unit configured to scan a mark-sense sheet to read editing information for specifying edit modes for editing image data to be output as one page of print data, and a generation unit to generate print data from the image data based on the read editing information.

With the configuration described above, even in hardware with limited display capabilities, if a mark-sense sheet is used to specify modes for editing image data in print data when one page of print data is to be generated from a large amount of image data such as that stored in a large-capacity storage unit, it is possible to easily control print data editing functions such as grouping and orientation adjustment, as well as allocation, organization, and layout that are necessary for generating one page of print data to be printed in an album format.

According to another aspect of the present invention, a mark-sense sheet in which a plurality of images and a plurality of mark fields associated with each of the plurality of images are arranged is generated, and the generated mark-sense sheet is printed according to a desired type of mark-sense sheet.

Further features of the present invention will become apparent from the following description of exemplary embodiments with reference to the attached drawings.

DESCRIPTION OF THE EXEMPLARY EMBODIMENTS

Figure 1:
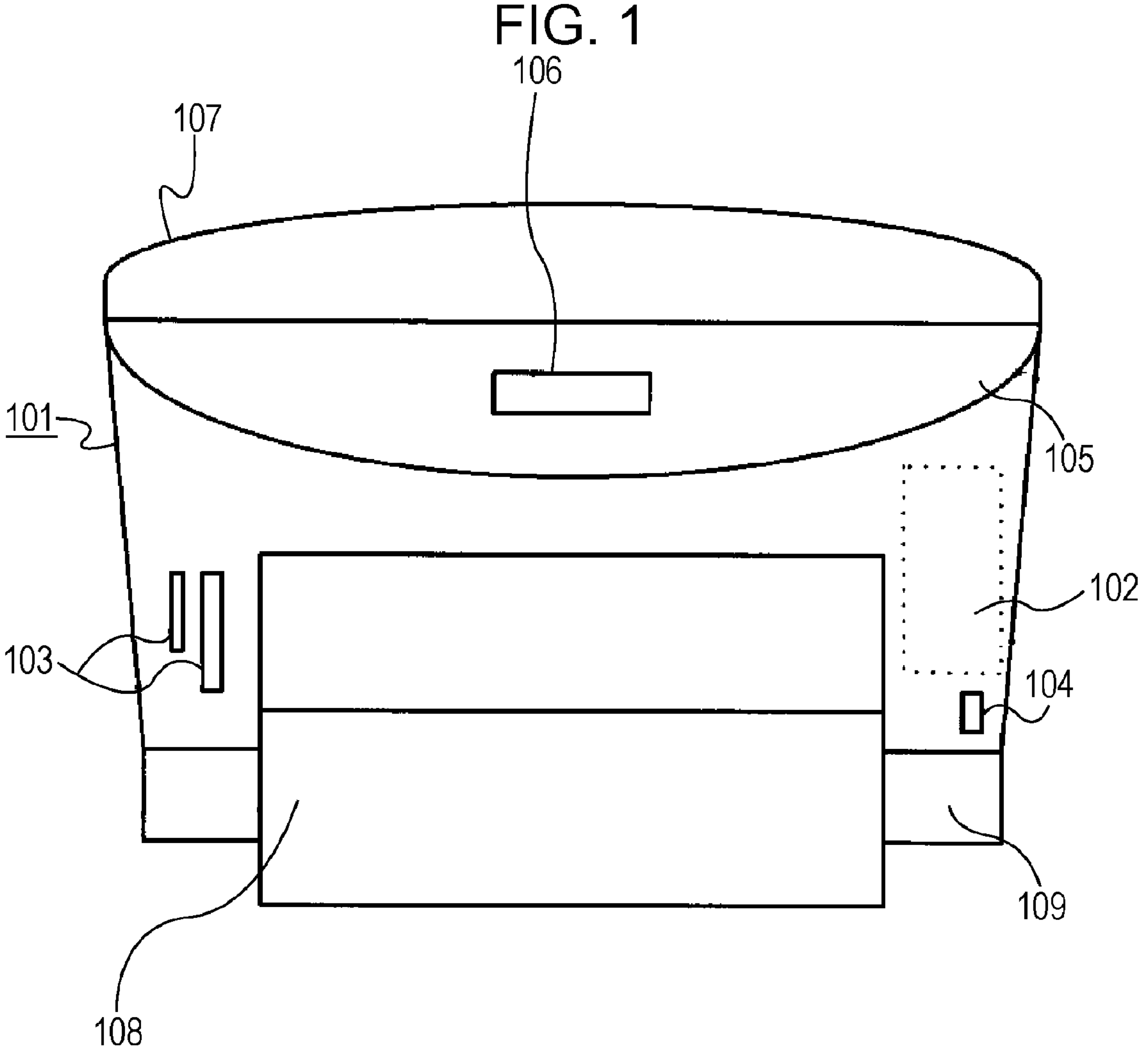
FIG. 1 is a front view illustrating an exemplary configuration of an MFP to which embodiments of the present invention may be applied.
Figure 2:
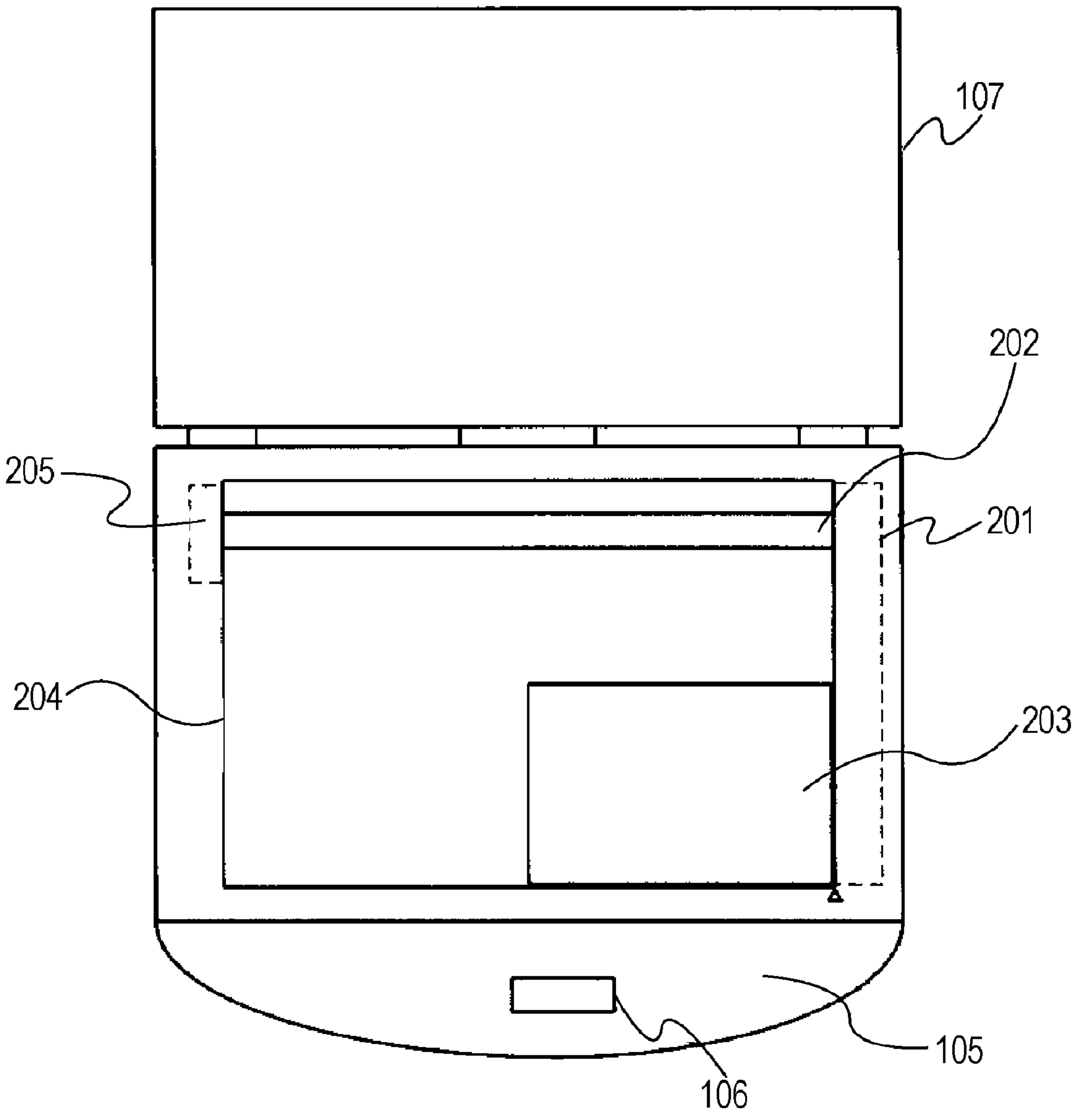
FIG. 2 is a top view illustrating an exemplary configuration of a scanning unit of the MFP to which embodiments of the present invention may be applied.
Figure 3:
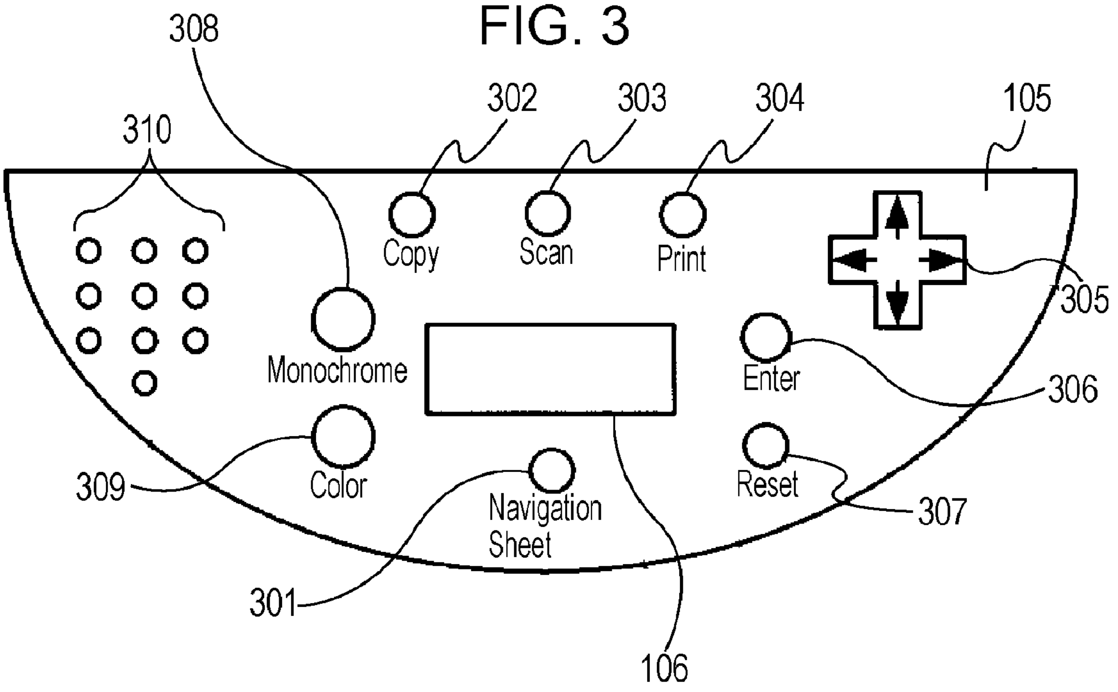
FIG. 3 illustrates an exemplary configuration of an operation unit of the MFP to which embodiments of the present invention may be applied.
Figure 4:
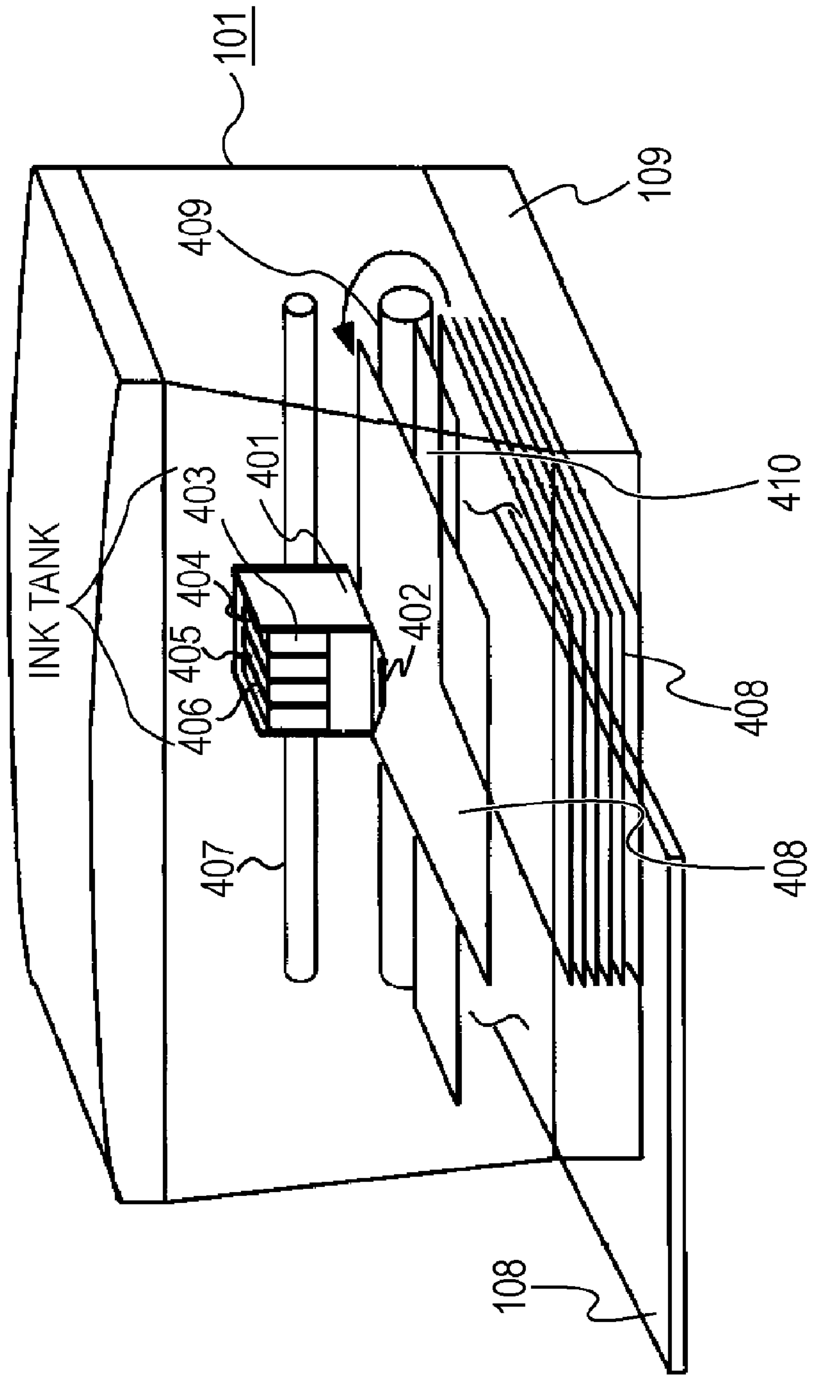
FIG. 4 illustrates an exemplary configuration of a printing unit of the MFP to which embodiments of the present invention may be applied.

FIGS. 1 to 4 illustrate exemplary configurations of an MFP 101 to which embodiments of the present invention may be applied. FIG. 1 is a front view of the MFP 101 and FIG. 2 is a top view of the MFP 101. FIG. 3 illustrates an exemplary arrangement of members of an operation unit 105. FIG. 4 illustrates an exemplary configuration of a recording system.

The MFP 101 primarily includes a printing unit and a scanning unit. In an embodiment, the printing unit is a serial inkjet printer, while the scanning unit is a flatbed scanner of a charge-coupled device (CCD) scanning type.

As illustrated in FIG. 1, a HDD 102 for storing a large amount of image data and many applications is internally provided on the right side of the MFP 101.

Memory card slots 103 for accommodating different types of memory cards used in digital cameras and the like are provided on the left side at the front of the MFP 101. In the present exemplary embodiment, the MFP 101 is provided with two memory card slots 103.

An external device connecting terminal (universal serial bus (USB) terminal) 104 for connection to an external device, such as a digital camera, DVD/CD-ROM drive, or removable HDD, is located on the right side at the front of the MFP 101. An interface, such as an Institute of Electrical and Electronic Engineers (IEEE) 1284 interface, for connection to a PC may be provided on the back of the MFP 101.

An operation panel including the operation unit 105 is at the upper front of the MFP 101. The operation panel is, for example, inclined downward toward the user. As illustrated in FIG. 3, the operation unit 105 provides a liquid crystal display (LCD) 106 serving as a display unit, operation buttons, and keys.

The LCD 106 is, for example, of a character display type and is primarily used for displaying the status of the MFP 101. The LCD 106 is also used for displaying the name of a file stored in a HDD 515 or a memory card 516 (see FIG. 5).

The operation buttons and keys of the operation unit 105 illustrated in FIG. 3 include a Navigation Sheet button 301 for performing control for a mark-sense sheet (navigation sheet) described below, a Copy button 302 for instructing the start of copying, a Scan button 303 for instructing the start of scanning, and a Print button 304 for instructing the start of printing.

The operation unit 105 also provides a directional control button (cursor key) 305 and an Enter button 306 that are used for menu operations and the like. A Reset button 307 is used to cancel actions in progress, reset (soft reset or hard reset) the current state of the MFP 101, and clear the settings.

A Monochrome button 308 and a Color button 309 are used to select a print color mode. A numeric keypad 310 is used to enter numbers and the like.

As illustrated in FIG. 1, a paper feed unit 109 for storing print sheets therein is disposed in a lower part of the MFP 101. A paper output tray 108 to which printed print sheets are ejected is disposed at the front of the MFP 101.

As described above, the MFP 101 of the present exemplary embodiment includes the printing unit and the scanning unit, the HDD 102, the memory card slots 103, and the external device connecting terminal 104. Therefore, without being connected to a PC, the MFP 101 can store scanned image data in a storage unit (e.g., memory card, HDD 102, or external device) and directly print or photocopy the image data stored in the storage unit.

An exemplary configuration of the scanning unit of the MFP 101 will be described with reference to FIG. 2. FIG. 2 is a top view of the MFP 101 with an upper cover 107 raised (i.e., opened).

The scanning unit primarily includes a scanner carriage 201, a shaft 202, a glass plate 204, and a scanner carriage drive motor 205.

The scanner carriage 201 includes a light source, a mirror, a lens, and a CCD. The scanner carriage 201 moves over the shaft 202 to optically read an image on an original document 203 placed on the glass plate 204.

For image scanning, the upper cover 107 of the MFP 101 is raised, the original document 203 is placed on the glass plate 204, the upper cover 107 is lowered, and the Scan button 303 (see FIG. 3) on the operation unit 105 is pressed.

When the Scan button 303 is pressed, the light source in the scanner carriage 201 is turned on. Then, the scanner carriage 201 moves over the shaft 202 and illuminates the original document 203 with light from the light source. The amount of light reflected off the original document 203 is read by the CCD. Image data read from the original document 203 can be output in copying operation or stored in a storage unit (e.g., memory card, HDD 102, or external device).

Next, an exemplary configuration of the printing unit of the MFP 101 will be described with reference to FIG. 4.

As illustrated in FIG. 4, the printing unit includes a printer carriage 401 and an inkjet print head 402 in a lower part of the printer carriage 401. Ink tanks 403 to 406 for four colors (i.e., from the right to left, black 403, cyan 404, magenta 405, and yellow 406) are mounted on the printer carriage 401.

The printer carriage 401 is supported by a shaft 407 and driven by a carriage motor (corresponding to reference numeral 505 described below) to move horizontally (i.e., main scanning for recording). A paper feed roller 409 driven by a paper feed motor (corresponding to reference numeral 506 described below) conveys a print sheet 408 in a direction intersecting the main scanning direction of the printer carriage 401 and thereby sub scanning is performed for recording. A platen 410 is disposed along a scanning range of the printer carriage 401 (print head 402) and supports the print sheet 408.

For printing, a print sheet 408 at the top of the paper feed unit 109 is drawn in a U shape (as indicated by an arrow in FIG. 4) by the paper feed roller 409.

Upon arrival of the leading edge of the print sheet 408 at a point under the print head 402, the printer carriage 401 starts horizontal reciprocating movement while ejecting fine ink droplets from the print head 402 onto the print sheet 408, thereby completing printing of one line. Then, the print sheet 408 is fed by one line and again the printer carriage 401 moves. Printing is thus performed by repeating the procedure described above. Upon completion of printing, the print sheet 408 is output to the paper output tray 108. The printing procedure is thus completed.

Figure 5:
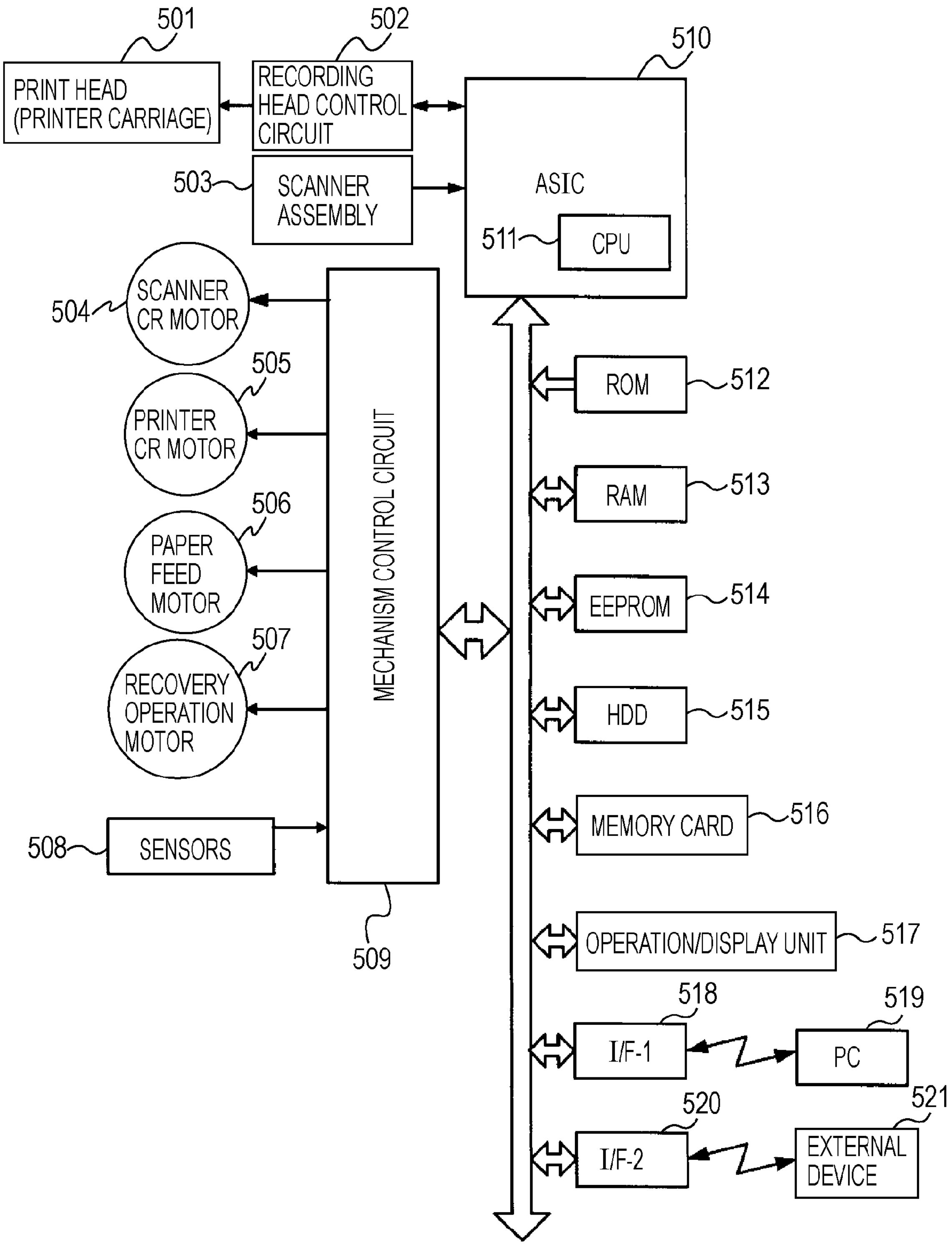
FIG. 5 is a block diagram illustrating an exemplary configuration of a control system of the MFP to which embodiments of the present invention may be applied.

FIG. 5 illustrates an exemplary configuration of a control system of the MFP 101. A print head control circuit (recording head control circuit) 502 electrically controls a print head 501 (corresponding to the print head 402 described above) on the printer carriage and generates drive pulses for ejecting ink on the basis of image data.

A scanner assembly 503 (corresponding to the scanner carriage 201) configured as described above is driven by a scanner carriage (CR) motor 504 to move. A printer CR motor 505 drives the printer carriage to move. A paper feed motor 506 is provided for conveying printed sheets. A recovery operation motor 507 drives a pump, for example, for clearing plugged nozzles of the print head 501.

Sensors 508 are provided for checking the operation of the printing unit and the scanning unit. A mechanism control circuit 509 controls and manages various motors and sensors.

An application specific integrated circuit (ASIC) 510 includes a central processing unit (CPU) 511 which performs overall control of each component according to processing procedures described below. A program corresponding to the processing procedures performed by the ASIC 510 is stored in read-only memory (ROM) 512. Random-access memory (RAM) 513 has a work area for the ASIC 510 to temporarily store parameters and scanned data in the process of performing the processing procedures. Nonvolatile memory 514, such as EEPROM, is provided for storing the state of the print head 501 even when the MFP 101 is not powered.

The HDD 515 (corresponding to the HDD 102 in FIG. 1) is, for example, an internal 1.8 inch HDD with a storage capacity of about 40 GB or more. The HDD 515 can be used for storing backup copies of data in the memory card 516 or backup copies of image data in an external device connected to the MFP 101, or for storing image data during scanning operation. A format of a mark-sense navigation sheet and applications necessary for the operation of the MFP 101 can also be stored in the HDD 515 (102).

The memory card 516 is a removable memory card that can also be used in other devices, such as digital cameras and PCs. In the MFP 101, the memory card 516 is inserted into one of the memory card slots 103 described above.

An operation/display unit 517 (corresponding to the operation unit 105 described above) provides operation buttons for allowing the user to perform predetermined operations. The operation/display unit 517 also provides buttons for turning the power on, setting online/offline connection to a host device, and the like.

A PC 519 serves as a host device which outputs and inputs image data to and from the MFP 101 and processes data, such as images, involved in printing and scanning. The PC 519 is connected to the MFP 101 via an interface (I/F-1) 518 and a cable. The I/F-1 518 is, for example, an IEEE 1284 interface or a USB interface.

An external device 521, such as a digital camera or an optical disk, is connected to the MFP 101 via an interface (I/F-2) 520 and a cable.

Next, an album navigation sheet 901 according to an embodiment will be described with reference to FIG. 9. The album navigation sheet 901 of the present exemplary embodiment is configured so that print control functions suitable for album printing can be performed.

Figure 9:
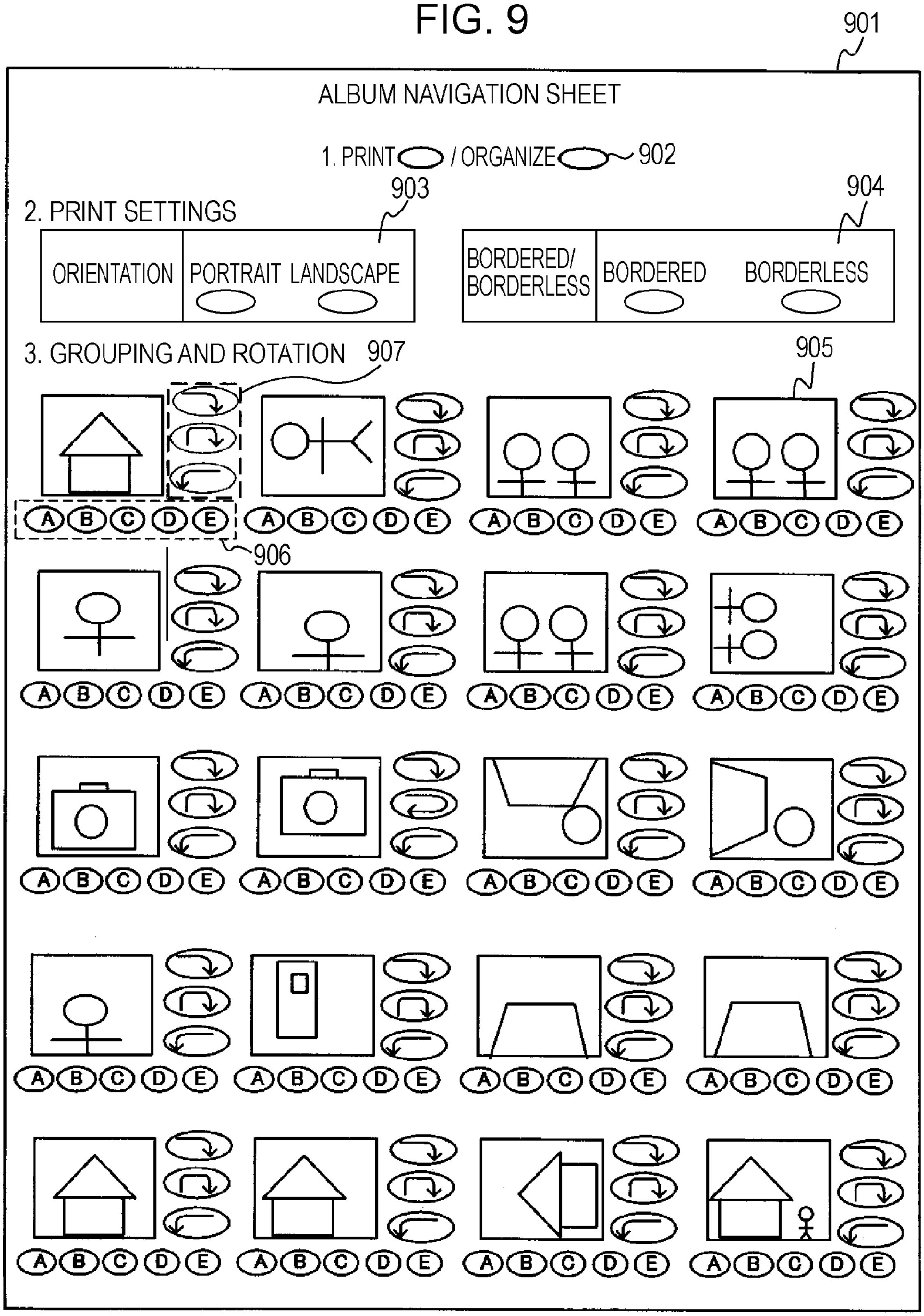
FIG. 9 illustrates an exemplary configuration of a photo navigation sheet according to an embodiment of the present invention.

That is, the album navigation sheet 901 illustrated in FIG. 9 (or FIG. 10 described below) is configured so that print data editing functions for organization, layout, grouping, orientation adjustment, and the like necessary for generating one page of print data to be printed in an album format can be controlled.

The album navigation sheet 901 of FIG. 9 is a mark-sense navigation sheet for printing or organizing image data in a storage unit, such as a memory card or a HDD, in an album format. By selecting and marking (e.g., with a pencil) necessary items in the album navigation sheet 901 and allowing the scanning unit to scan the album navigation sheet 901, image data in the storage unit can be printed or organized in an album format.

As illustrated in FIG. 9, three headings of “1. PRINT/ORGANIZE”, “2. PRINT SETTINGS”, and “3. GROUPING AND ROTATION” are printed on the album navigation sheet 901.

In a mark field 902 for “1. PRINT/ORGANIZE”, the user selects whether photo image data stored in the storage unit is to be printed in an album format or organized. If “PRINT” is selected, the image data laid out in an album format is printed. If “ORGANIZE” is selected, a file in which photo image data in the storage unit is laid out in an album format is created.

The section “2. PRINT SETTINGS” provides a mark field 903 for determining whether a print sheet for album printing is to be used in a portrait or landscape format, and a mark field 904 for determining whether photos laid out in an album format are to be framed.

In the section “3. GROUPING AND ROTATION”, thumbnail images 905 of photo image data in the storage unit are printed. Each of the thumbnail images 905 is provided with grouping marks 906 of letters A to E of the alphabet printed thereunder for grouping photo images. Each of the thumbnail images 905 is also provided with rotation marks 907 printed to the right thereof for rotating the corresponding photo image.

The grouping marks 906 enable grouping of photo images corresponding to the thumbnail images 905. By marking (i.e., filling in) the grouping marks 906 of the same letter of the alphabet with respect to several thumbnail images 905, their corresponding photo images can be grouped into the same group. The photo images in the same group are allocated, as print data, to an album page of the group in a predetermined order, such as the date and time of the photo image data, and then output.

The rotation marks 907 to the right of each thumbnail image 905 are used to rotate the corresponding photo image for album printing. The three rotation marks 907 allow rotation of the corresponding photo image by 90 degrees to the right, 180 degrees, and 90 degrees to the left, respectively, in order from the top. By selecting one of the three rotation marks 907 for each thumbnail image 905, album print data can be generated such that the corresponding photo image is oriented as desired by the user. If none of three rotation marks 907 is selected, album data is generated such that the corresponding photo image is oriented as displayed in the album navigation sheet 901.

Figure 11:
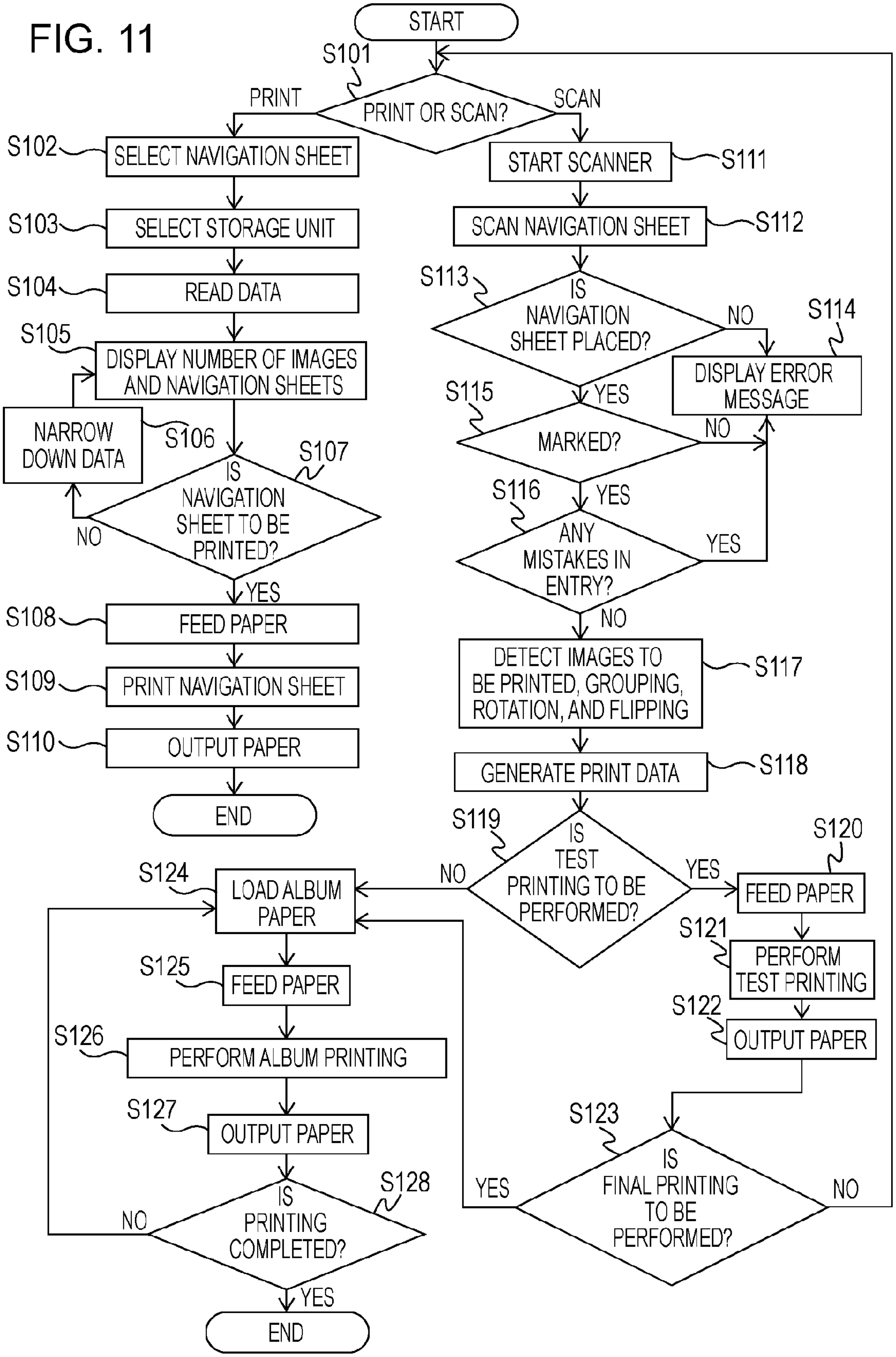
FIG. 11 is a flowchart illustrating a control procedure for controlling album printing according to an embodiment of the present invention.

Next, a method of performing album printing of photo image data in a storage unit will be described with reference to FIG. 11. A control procedure illustrated in FIG. 11 is a procedure for controlling album printing of the present exemplary embodiment and is performed by the CPU 511. The control procedure of the FIG. 11 is stored in the ROM 512 or the HDD 515 (102) as a program of the CPU 511.

Figure 6A:
FIGS. 6A to 6D illustrate an operation procedure controlled through a display on the MFP according to an embodiment of the present invention.

To perform album printing, first, it is necessary to print the album navigation sheet 901. For example, when the user presses the Navigation Sheet button 301 of the operation unit 105, the LCD 106 displays options as illustrated in FIG. 6A to prompt the user to determine whether a navigation sheet is to be printed or scanned. If the navigation sheet is to be printed, the user selects "PRINT" using the directional control button 305 and confirms the selection using the Enter button 306 (step S101).

Figure 6B:
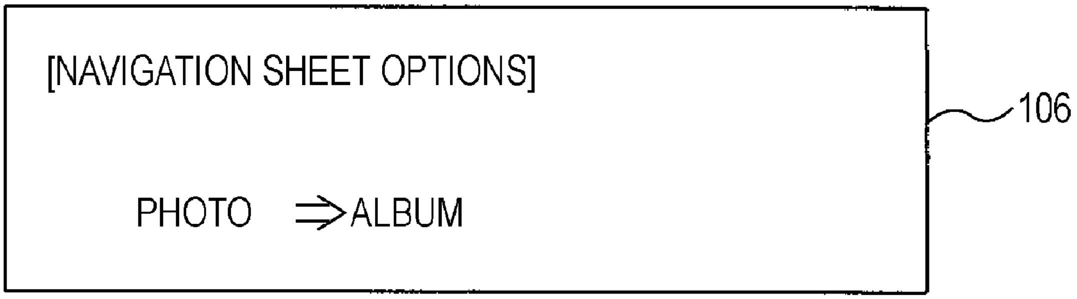
Figure 7:
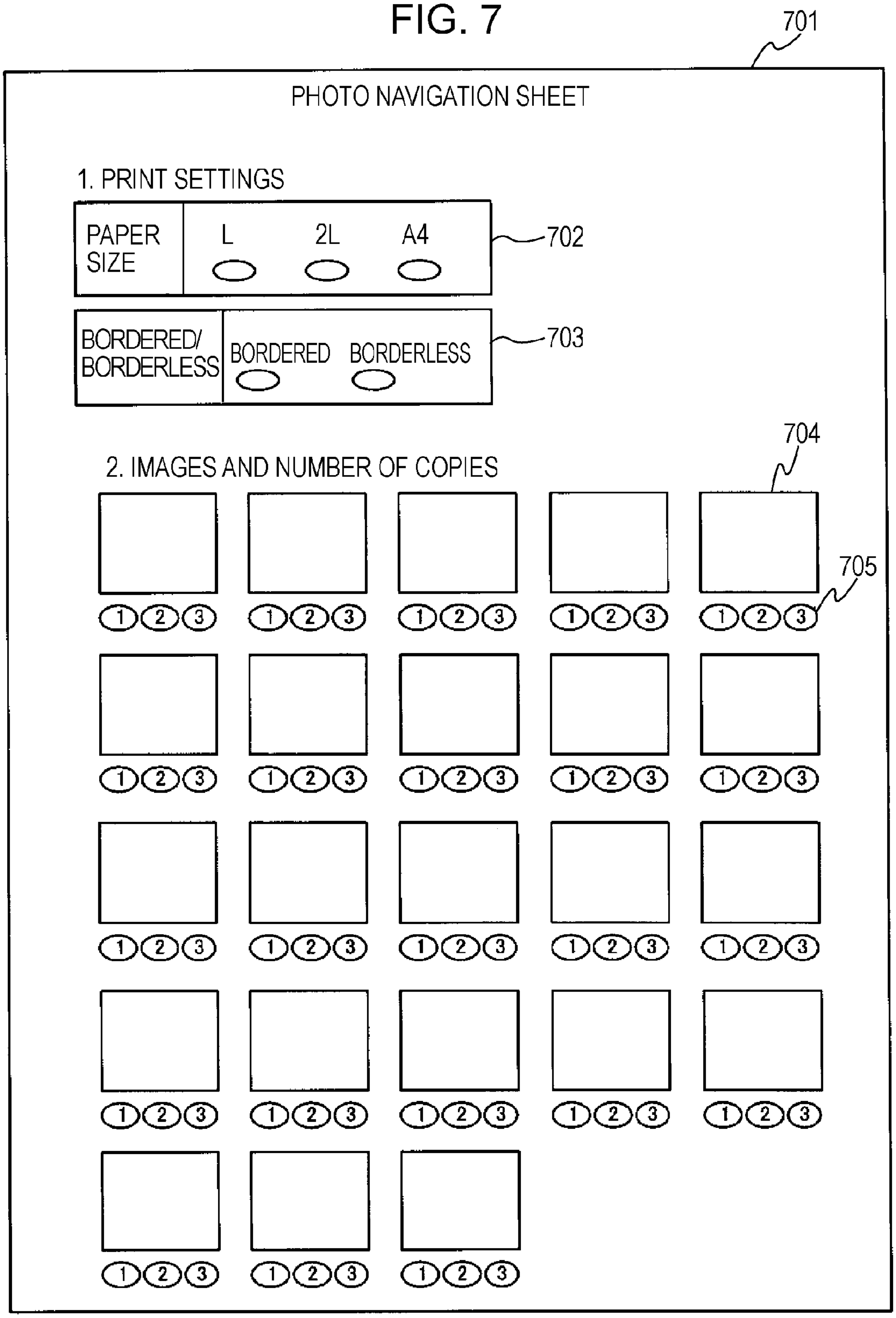
PRIOR ART FIG. 7
FIG. 7 illustrates an exemplary configuration of a known photo navigation sheet.
Figure 8:
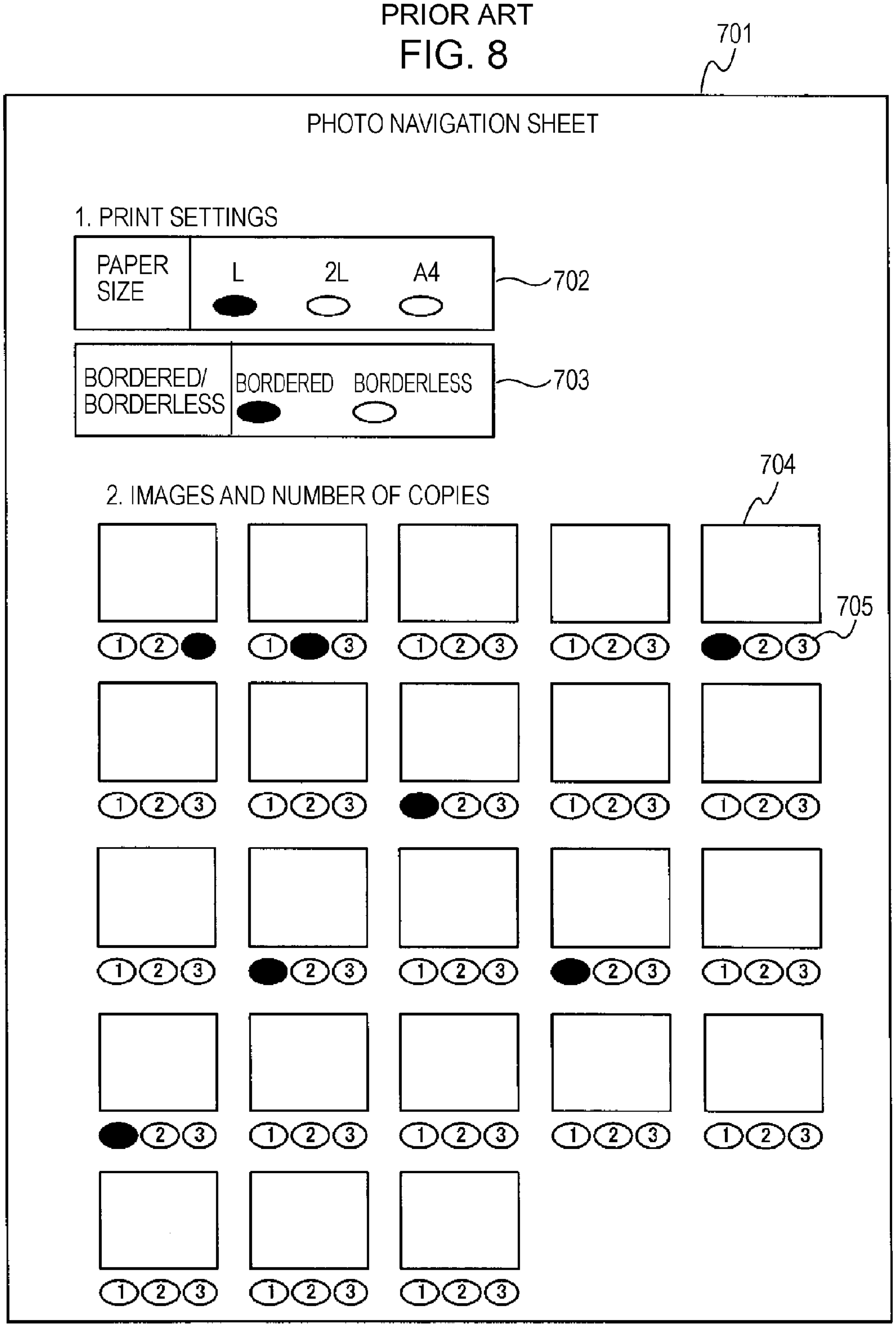
PRIOR ART FIG. 8
FIG. 8 illustrates an exemplary configuration of the known photo navigation sheet (marked).

Next, the user selects the type of navigation sheet from options displayed as illustrated in FIG. 6B (step S102). In FIG. 6B, "PHOTO" representing a navigation sheet for photographs (see FIG. 7 and FIG. 8) and "ALBUM" representing a navigation sheet for albums (see FIG. 9 and FIG. 10) are displayed. Here, the user selects the navigation sheet represented by "ALBUM".

Figure 6C:
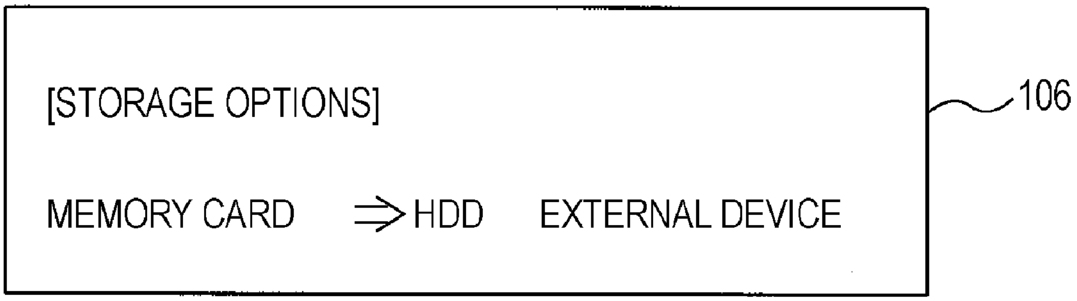

Next, from options displayed as in FIG. 6C, the user selects the type of storage unit in which photo data for album printing is stored (step S103). Here, the user selects "HDD", as photo data to be processed is stored in the HDD 515 (102).

Figure 6D:
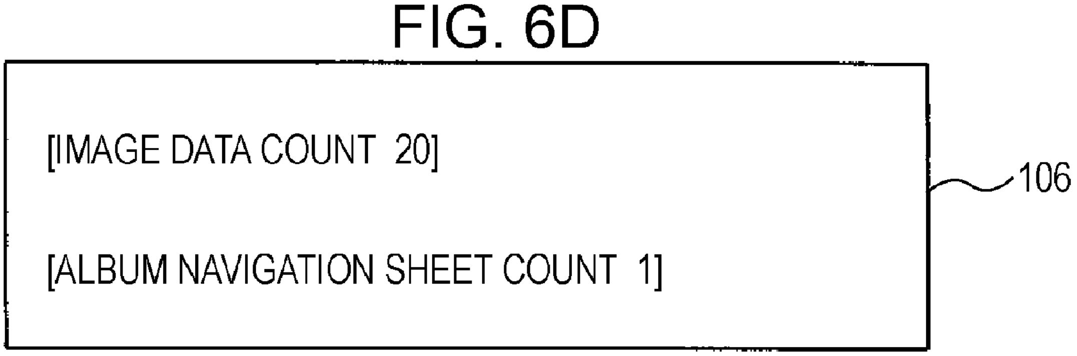

After the selection of a storage unit, images stored in the selected storage unit are read out (step S104). Then, as illustrated in FIG. 6D, the LCD 106 displays the number of pieces of image data and the number of album navigation sheets at the point (step S105). From the display, the user determines whether the album navigation sheet is to be printed (step S107).

In the present exemplary embodiment, the number of pieces of image data is 20 and the number of album navigation sheets is 1. If the user determines not to print album navigation sheets (no in step S107) because, for example, there are too many pieces of image data or album navigation sheets, the process proceeds to step S106 where it is possible to limit the number of pieces of image data by specifying a date, image size, or the like.

Menu interfaces similar to those illustrated in FIGS. 6A to 6D can be used as user interfaces for steps S105 to S107. The user can use the numeric keypad 310 of the operation unit 105 to enter numbers (or characters) required to specify a date or image size.

If the user determines to perform printing of the album navigation sheet (yes in step S107), the process proceeds to steps S108 through S110 to print the album navigation sheet 901 on, for example, A4 plain paper. More specifically, this is performed by the printing unit illustrated in FIG. 4 in the order of paper feed (step S108), printing (step S109), and paper output (step S110).

Then, the user fills in marks in the sections "1. PRINT/ORGANIZE", "2. PRINT SETTINGS", and "3. GROUPING AND ROTATION" on the printed album navigation sheet 901 illustrated in FIG. 9.

Figure 10:
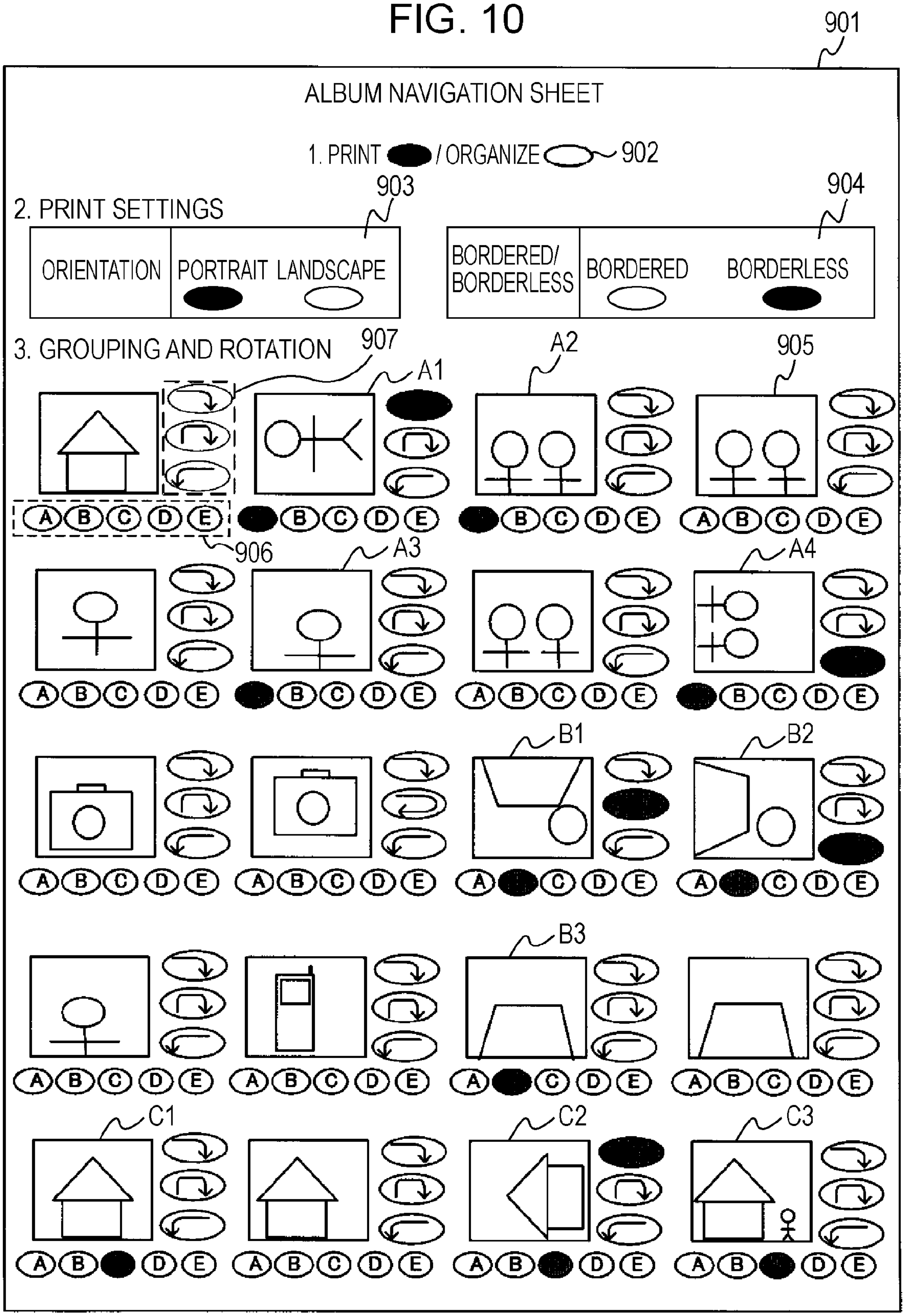
FIG. 10 illustrates an exemplary configuration of the photo navigation sheet (marked) according to an embodiment of the present invention.

Here, as illustrated in the album navigation sheet 901 of FIG. 10, the user selects album printing. In FIG. 10, the user fills in marks (as indicated by filled-in portions) to select portrait and borderless printing and divide photo images into three groups A, B, and C. In the example of FIG. 10, photo images A1 to A4, B1 to B3, and C1 to C3 are divided into groups A, B, and C, respectively, by filling in the grouping marks 906, while the rotating state (i.e., orientation) of each photo image is specified by selecting one of the three rotation marks 907 adjacent to the corresponding thumbnail image 905.

Then, editing information for specifying edit modes for editing image data to be output as one page of print data is read from the mark-sense sheet illustrated in FIG. 9 and FIG. 10. Print data can thus be generated from the image data on the basis of the read editing information. Specifically, according to editing information read from the grouping marks 906 and the rotation marks 907, photo images A1 to A4, B1 to B3, and C1 to C3 are divided into groups and output as one page of print data in orientations as specified.

Referring back to FIG. 11, if "SCAN" is selected in step S101, the album navigation sheet 901 filled in as described above is scanned by the scanning unit (see FIG. 2). That is, after the album navigation sheet 901 is placed on the glass plate 204 of the scanning unit, the upper cover 107 is closed and the Navigation Sheet button 301 is pressed. This starts the scanning unit (step S111), which scans the album navigation sheet 901 (step S112).

The scanning unit can be automatically started when a sensor capable of detecting the presence of an original document on the glass plate 204 detects the presence of an original document and the Navigation Sheet button 301 is pressed. Alternatively, if the presence of an original document cannot be detected, the scanning unit may be started by selecting an option from a menu, such as that illustrated in FIG. 6A.

Next, the scanned image data is to be analyzed. First, whether or not the sheet placed on the glass plate 204 is a mark-sense navigation sheet is determined on the basis of the presence or absence of marks on the sheet (step S113). Then, it is examined whether marks for necessary items are filled in (step S115) and whether there are any mistakes in the entry (step S116). An error message will be displayed (step S114) if the type of the sheet placed on the glass plate 204 is wrong, any required mark is not filled in, the number of marks is wrong, or any error in marking position is found.

If the sheet and marks are appropriate, images to be printed and the ways of grouping and rotation are determined from marks in the scanned images (step S117). On the basis of this determination, print data for album printing is generated (step S118).

Next, the LCD 106 displays a menu interface similar to those illustrated in FIGS. 6A to 6D so as to prompt the user to determine whether test printing is to be performed (step S119). If the user determines that test printing is to be performed (yes in step S119), the process proceeds to perform test printing in the order of paper feed (step S120), printing (step S121), and paper output (step S122).

Figure 12:
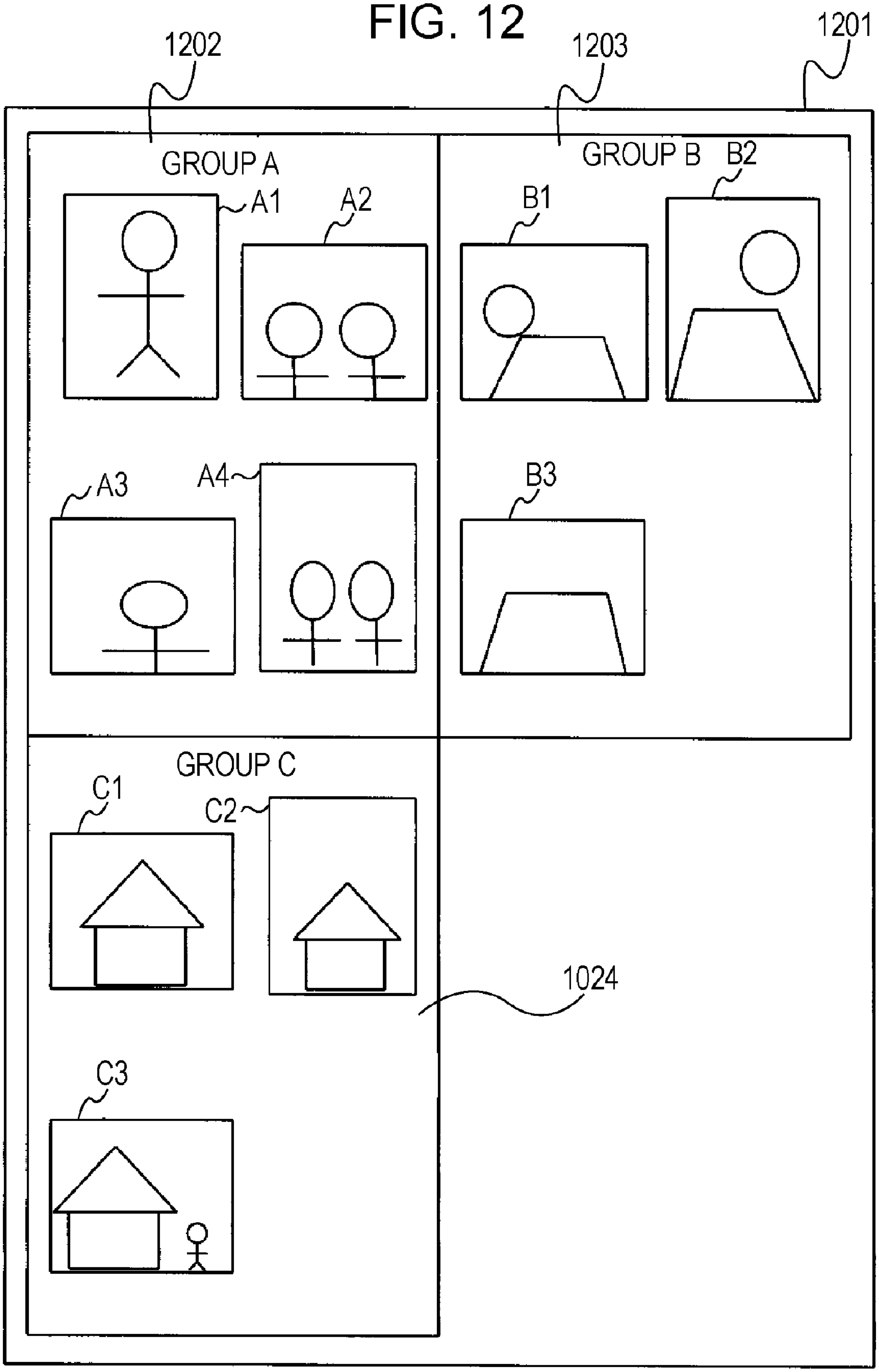
FIG. 12 illustrates an exemplary result of test album printing according to an embodiment of the present invention.

For example, as illustrated in FIG. 12, test printing is performed by printing photo images of each group in a reduced size on a sheet of A4 plain paper. In the example of FIG. 12, photo images in groups A, B, and C corresponding to pages 1202, 1203, and 1204, respectively, of a three-page A4 size album are printed on a single sheet of A4 print paper 1201 in a reduced size. That is, photo images A1 to A4, B1 to B3, and C1 to C3 divided into groups A, B, and C as specified in the album navigation sheet 901 of FIG. 10 are allocated to the reduced-size pages 1202, 1203, and 1204, respectively, and output. The rotating states (i.e., orientations) of the photo images are also as specified in the album navigation sheet 901 of FIG. 10.

Next, the LCD 106 displays a menu interface similar to those illustrated in FIGS. 6A to 6D to prompt the user to determine whether final printing is to be performed (step S123).

If it is determined from the result of test printing on the print paper 1201 that any corrections are needed (no in step S123), the process returns to step S101. Then, the album navigation sheet 901 is scanned again after images to be printed or associated marks are reselected. Alternatively, the album navigation sheet 901 may be printed again and scanned.

If it is determined in step S123 that final printing (album printing) is to be performed, print sheets for album printing (e.g., sheets of glossy paper) are placed on the paper feed unit 109 (step S124). Then, a print sheet is fed (step S125) and album printing is performed on the fed sheet (step S126). The printed sheet is then output (step S127).

Figure 13:
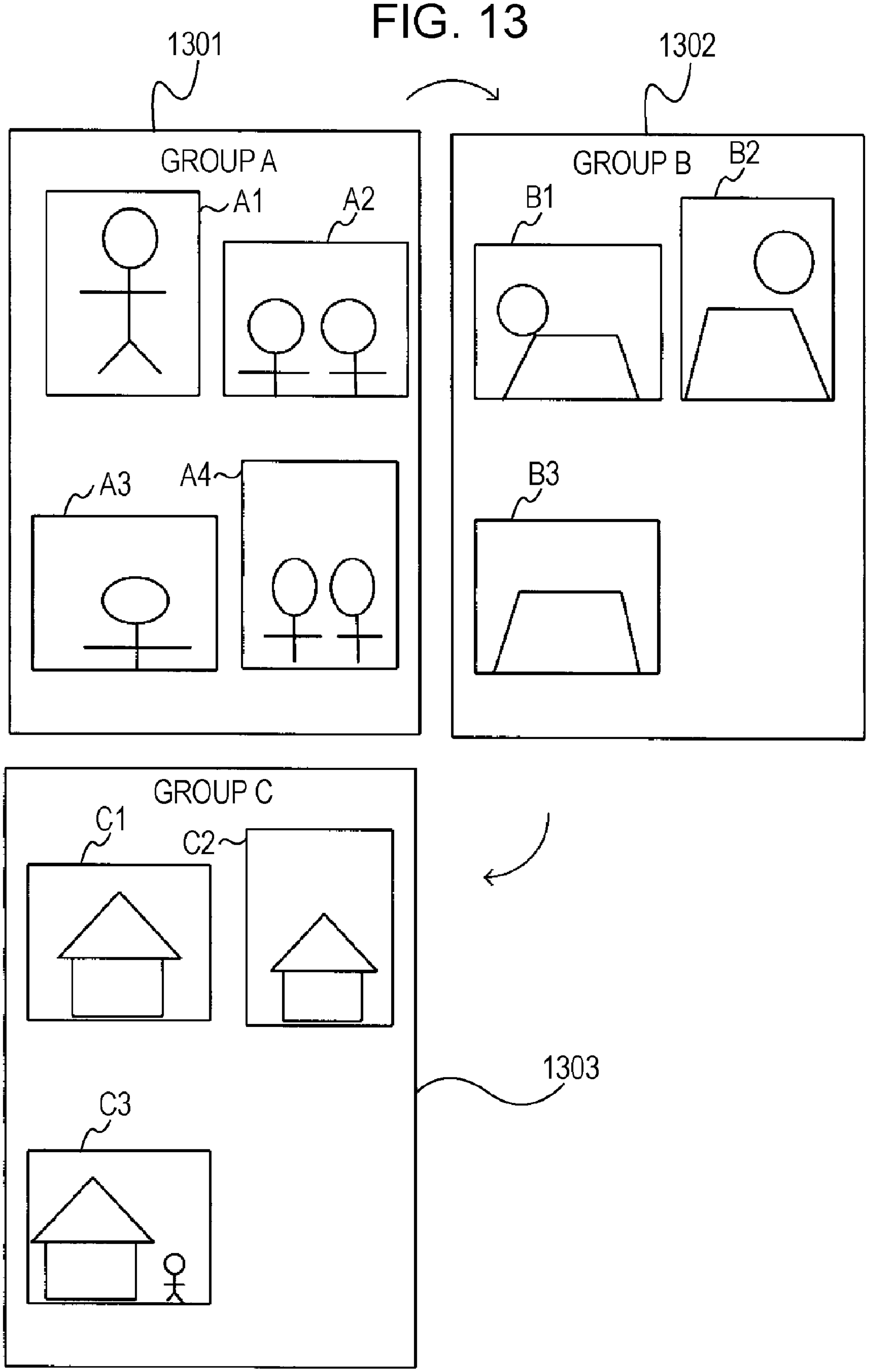
FIG. 13 illustrates an exemplary result of album printing according to an embodiment of the present invention.

FIG. 13 illustrates an exemplary result of final printing (album printing) of groups A to C. Referring to FIG. 13, three pages, which are printed together on a single A4 sheet in a reduced size in FIG. 12, are printed on respective A4 sheets. Photo images A1 to A4, B1 to B3, and C1 to C3 divided into groups A, B, and C as specified in the album navigation sheet 901 of FIG. 10 are allocated to pages 1301, 1302, and 1303, respectively, and output. The rotating states (i.e., orientations) of the photo images are also as specified in the album navigation sheet 901 of FIG. 10.

When all the selected groups of photo images (i.e., three sheets) are output (yes in step S128), album printing is completed.

As will be understood from the description above, with the present exemplary embodiment, it is possible to perform, using an album navigation sheet, grouping, orientation adjustment, and album printing of photo image data stored in a storage unit connected to an MFP.

By using the album navigation sheet illustrated in FIG. 9 and FIG. 10, data stored in a storage unit can be organized in an album format in a similar manner to that for album printing.

More specifically, if "ORGANIZE" is selected in "1. PRINT/ORGANIZE" section (see FIG. 9), print data for each page of an album to be printed as in FIG. 13 is generated and stored in a storage unit (e.g., HDD 515 (102)). This can be done by following a control procedure similar to steps S111 to 128 of FIG. 11. In this case, print processing performed in steps S120 to S123 and steps S125 to S128 is replaced with output processing in which print data is output to a print data file.

When the stored print data needs to be actually printed, it is only necessary to output the stored print data for each page of an album. It is also possible that the print data file generated for each page of the album is downloaded from the storage unit to a PC or the like and used.

Print data format for each page of an album may be, for example, a Joint Photographic Experts Group (JPEG) format, portable document format (PDF), or post script (PS) format. In PDF or PS format, print data for a plurality of pages can be combined into a single file and thus can be more easily organized later.

As will be understood from the description above, with the present exemplary embodiment, it is possible to specify, using a mark-sense sheet, modes for editing image data in print data when one page of print data is to be generated from a large amount of image data such as that stored in a large-capacity storage unit. Thus, it is possible to very easily control print data editing functions such as grouping and orientation adjustment, as well as allocation, organization, and layout that are necessary for generating one page of print data to be printed in an album format.

While an inkjet method (e.g., bubble jet method) has been described as a recording method in the above embodiment, the present invention is not limited to the recording method for a navigation sheet. For example, the present invention is also applicable to piezoelectric printers, thermal transfer printers, and electrophotographic printers.

While photo image data is used as image data in the present exemplary embodiment, image data to be printed or organized in an album format is not limited to photo image data. For example, text image data, name-card image data, and post-card image data may also be used.

While an MFP has been described as an exemplary embodiment, the present invention is not limited to a particular type of product. For example, the present invention is applicable to an image processing system in which an image printing unit and an image scanning unit are separate from each other.

While images are rotated by 90 or 180 degrees in the above embodiment for illustrative purposes, it is possible to specify vertical and horizontal flipping of images by printing additional options in a mark field.

While a navigation sheet is printed by and used in one and the same apparatus in the above embodiment, a navigation sheet to be used in an apparatus may be that printed by a different apparatus. For example, even if an apparatus is designed to accept an already printed navigation sheet supplied by the user, edit modes for editing image data to be output as one page of print data can be specified through the navigation sheet.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-103722 filed Apr. 5, 2006, which is hereby incorporated by reference herein in its entirety.

What is claimed is:

1. An image processing apparatus comprising:

a print control unit configured to cause a printing apparatus to print an image on a sheet so that a user can, by adding information on the sheet, designate a group corresponding to each of one or more images individually;

an acquiring unit configured to acquire a read image obtained by reading, by a reading apparatus, of the sheet printed by the print control unit and on which information is added by a user;

a determining unit configured to determine a group corresponding to each of the one or more images designated by the user individually, based on the read image acquired by the acquiring unit;

a specifying unit configured, in a case where the determining unit determines a plurality of groups, to sort images for each of the plurality of groups and to specify a layout method for the sorted images from a plurality of layout methods in accordance with an instruction by a user; and an outputting unit configured to, in a case where the determining unit determines the plurality of groups, lay out images included in the plurality of groups by using the layout method specified by the specifying unit, and output the laid out images.

2. The image processing apparatus according to claim 1, wherein the determining unit determines an editing process for each of the one or more images based on the read image, in addition to the group, and the outputting unit outputs the one or more images which are edited according to the editing process determined by the determining unit.

3. The image processing apparatus according to claim 2, wherein the editing process determined by the determining unit is a rotating process.

4. The image processing apparatus according to claim 1, wherein the outputting unit causes the printing apparatus to print the images included in the plurality of groups such that the groups are distinct from each other.

5. The image processing apparatus according to claim 4, wherein the outputting unit causes the printing apparatus to print one or more images of each of the groups in a different area of one sheet.

6. The image processing apparatus according to claim 4, wherein the outputting unit causes the printing apparatus to print one or more images of each of the groups on a different sheet.

7. The image processing apparatus according to claim 1, further comprising:

a selecting unit configured to select an outputting method from a plurality of outputting methods collectively for the images included in the plurality of groups, based on the read image, wherein the outputting unit outputs the images by using the output method selected by the selecting unit collectively for the images.

8. The image processing apparatus according to claim 7, wherein the selecting unit selects printing of the images or generating a file storing the images, as the outputting method by the outputting unit.

9. The image processing apparatus according to claim 1, further comprising:

a display control unit configured to cause a display apparatus to display information for selecting the layout method, wherein the specifying unit specifies the layout method in accordance with an instruction by a user based on the information displayed by the display control unit.

10. The image processing apparatus according to claim 1, wherein the plurality of layout methods include a layout method for a test printing.

11. An image processing method comprising:

causing a printing apparatus to print an image on a sheet so that a user can, by adding information on the sheet, designate a group corresponding to each of one or more images individually;

acquiring a read image obtained by reading, by a reading apparatus, of the sheet caused to be printed and on which information is added by a user;

determining a group corresponding to each of the one or more images designated by the user individually, based on the acquired read image;

in a case where a plurality of groups is determined, sorting images for each of the plurality of groups and specifying a layout method for the sorted images from a plurality of layout methods in accordance with an instruction by a user; and when the determining step determines the plurality of groups, s laying out images included in the plurality of groups by using the layout method specified in the specifying step, and outputting the laid out images.

12. The method according to claim 11, wherein an editing process for each of the one or more images is determined based on the read image, in addition to the group, and the one or more images which are edited according to the determined editing process are outputted.

13. The method according to claim 12, wherein the determined editing process is a rotating process.

14. The method according to claim 11, wherein the plurality of images of each of the plurality of groups corresponding to each of the one or more images are printed by the printing apparatus such that the groups are distinct from each other.

15. A non-transitory computer-readable storage medium that stores a computer program for causing a computer to execute the image processing method of claim 11.

* * * * *